United States Patent Office 3,157,612
Patented Nov. 17, 1964

3,157,612
REDUCING DIE SWELL OF EXTRUDED ETHYLENE POLYMERS WITH AN ADDITIVE OF IRON PHTHALOCYANINE AND ZINC PENTACHLOROTHIOPHENOL
Roger M. McGlamery, Bartlesville, Okla., assignor to Phillips Petroleum Company, a corporation of Delaware
No Drawing. Filed May 31, 1962, Ser. No. 198,738
6 Claims. (Cl. 260—30.2)

This invention relates to reducing the die swell of extruded ethylene polymers. In another aspect, it relates to a method for reducing the die swell of polymers of ethylene during extrusion operations, thus providing extruded articles of ethylene polymers having improved properties. In a further aspect, it relates to a novel plastic composition comprising an ethylene polymer and an additive which significantly reduces the tendency of such compositions to swell upon being extruded through a die.

Polymers of 1-olefins, such as polyethylene and copolymers of ethylene and propylene or 1-butene, are enjoying increasing commercial and industrial application. This is particularly true of the high molecular weight, rigid ethylene polymers made by low pressure processes. One of the important processing techniques for fabricating articles from ethylene polymers is that of extrusion. In the extrusion technique a molten, normally solid ethylene polymer is forced through an orifice, such as a die opening, and the resulting extrudate is then cooled to form a solid article. In fabricating articles of ethylene polymers by the extrusion technique, it has been observed that as the extrudate leaves the orifice it tends to swell while still in the molten state to a size larger than the orifice, resulting in a deformed article. For example, in fabricating blow molded articles, where the molten, normally solid ethylene polymer is extruded through a die to form a parison which is expanded with air within a mold, as in the case of forming bottles and like containers, the swelling phenomenon leads to development of variations in the thickness of the container's wall, such irregularity lowering the impact strength thereof because of alternating areas of reduced thickness. It is to the solution of this swelling problem that this invention is primarily addressed.

Accordingly, an object of this invention is to reduce the swelling tendency of ethylene polymers. Another object is to provide a method of reducing the swelling of polymers of ethylene during extrusion operations, thus providing extruded articles having enhanced properties. Another object is to provide a method of reducing the swelling tendency of ethylene polymers when the same are extruded and blow molded to form bottles or like containers. Another object is to provide an improved plastic composition comprising an ethylene polymer and an additive which reduces the swelling tendency of such plastic composition when the same is extruded. Other objects and advantages of this will become apparent to those skilled in the art from the following discussion and appended claims.

I have now discovered that the tendency of polymers of ethylene to swell during extrusion operations can be significantly reduced by incorporating in the polymer mass to be extruded an additive comprising in admixture iron phthalocyanine and zinc pentachlorothiophenol.

The anti-swelling additive of this invention is incorporated into the ethylene polymer in any convenient manner, such as mixing in a Banbury mixer, at temperatures either below or above the softening point of the polymer, preferably the latter. Incorporation can also be effected by dry blending the polymer with the additive and then heating the mixture above the polymer's softening point, for example in the extruder. The preferred method of incorporating the additive is by mixing it with the molten, normally solid ethylene polymer with mechanical working such as on a roll mill or in a Banbury mixer, for example at elevated temperatures in the range of 290 to 500° F., preferably in the presence of oxygen. Blending can be continued until a homogenous mixture is obtained, for example 2 to 25 minutes. Following incorporation of the additive into the polymer, the resulting composition can be extruded through an orifice such as a die opening in a conventional manner to form the extrudate, which can be shaped as desired, for example by blow molding.

The amount of additive used can vary and will be dependent upon such factors as the particular ethylene polymer used, extrusion conditions, and the ultimate utility of the extruded article. Stated functionally, the amount of additive used in this invention will be that amount sufficient to reduce the swelling tendency of the ethylene polymer when the same is extruded through an orifice. Generally, the amount of additive used in this invention will be in the range of about 0.01 to 5, preferably 0.2 to 3, parts by weight per 100 parts of polymer. Relative proportions of iron phthalocyanine and zinc pentachlorothiophenol in the composite additive can vary widely, and generally the amount of iron phthalocyanine will be from 5 to 95 weight percent and the amount of zinc pentachlorothiophenol from 95 to 5 weight percent, based on the total weight of the iron and zinc compounds. Usually, the amount of the iron compound in the additive will be a minor amount, i.e., less than 50 weight percent. A typical additive of this invention comprising 13 to 17 weight percent iron phthalocyanine and 83 to 87 weight percent zinc pentachlorothiophenol, as active ingredients. These active ingredients may be combined with an inert material, such as a hydrocarbon wax, if desired, the amount of such inert material being from 10 to 20 weight percent of the total additive composition. The additive of this invention can be obtained as an article of commerce sold as "Endor."

Incorporation of the additive in the ethylene polymer reduces or inhibits the swelling tendency of such polymer when the same is extruded through an orifice, such as a die opening. A supplementary benefit obtained by such treatment is the minimization or prevention of the cross-linking of the polymer, in the presence of oxygen, thus obviating the incorporation of the usual anti-oxidants into the polymer, although such anti-oxidants can be used if desired. Another effect noted by the practice of this invention is that although the incorporation of the additive does increase the flow rate of the molten polymer (as measured in a standard melt indexer), the reduction in swelling occurs independently of the flow rate. For example, if an ethylene polymer having the additive of this invention incorporated therein is extruded, the tendency of the treated ethylene polymer to swell as it leaves the orifice will be significantly less than that of ethylene polymer containing no anti-swelling additive and having the same melt index and extruded under the same conditions.

The polymers which can be treated according to this invention are broadly polymers of ethylene, and include homopolymers of ethylene and copolymers of ethylene and at least one higher molecular weight 1-olefin, especially aliphatic olefins having 3 to 8 carbon atoms per molecule, for example, propylene, 1-butene, isobutylene, 1-pentene, 1-hexene, 4-methyl-1-pentene, 1-octene, and the like. In such copolymers, the higher olefin is used in minor amounts as compared with ethylene and usually does not exceed about 10 weight percent of the total monomers. Ethylene polymers of high molecular weight such as those produced in slurry-type operations can be used per se or, if desired, prior to incorporation of the additive, they can be pyrolized to lower molecular weight. The high density, rigid ethylene polymers produced by low pressure processes are preferred, with the density of such polymers being in the range of 0.93 to 0.980 grams/cc. (ASTM D1505–57T). The preferred polymers are those produced according to U.S. Patent No. 2,825,721, issued March 4, 1958, to J. P. Hogan et al. The particle form polymer produced according to the method disclosed in copending U.S. application Serial No. 590,567, filed June 11, 1956, by G. T. Leathermann et al. (now abandoned) can also be treated according to this invention. Polymers produced according to the method disclosed in copending application Serial No. 625,005, filed November 29, 1956, by William B. Reynolds et al. (now abandoned) can also be treated according to this invention. In addition, it is within the scope of this invention to treat blends of different ethylene polymers, such as those polymer blends disclosed in copending U.S. application Serial No. 166,419, filed January 15, 1962, by M. R. Cines, such blends having a melt index in the range of 0.70 to 0.5 and a density in the range of 0.935 to 0.950.

The following example further illustrates the objects and advantages of this invention, but the various materials used, amounts, and conditions recited in this example should not be construed to limit unduly this invention.

An ethylene polymer blend was prepared according to the method disclosed in said copending application Serial No. 166,419 by mixing 30 parts by weight of a high molecular weight, particle form polymer of ethylene and 1-butene, prepared by the method disclosed in said copending application Serial No. 590,567 (now abandoned) and having a density of 0.942 and a melt index (high load) of 2.6, with 70 parts by weight of a solution polymerized ethylene polymer, prepared according to the method disclosed by said U.S. Patent 2,825,721 and having a density of 0.965 and a melt index 5.0.

One portion of the polymer blend was mixed with one weight percent 2,6-di-tert-butyl-4-methylphenol ("Ionol," a commercial anti-oxidant) and a second portion of the polymer blend was mixed with one weight percent of an additive ("Endor") comprising iron phthalocyanine and zinc pentachlorothiophenol. These polymer compositions were then melted in a Brabender Plastograph to an equilibrium consistency in a nitrogen atmosphere at 230° F., then for 10 minutes in air. At the end of the milling period, one weight percent of 2,6-di-tert-butyl-4-methylphenol was added as an anti-oxidant to that polymer blend containing the additive of this invention and milled into such polymer composition. A third portion of the polymer blend was milled in the same manner without either the anti-oxidant or the additive of this invention, and then one weight percent of the 2,6-di-tert-butyl-4-methylphenol was added at the end of the 10 minutes' milling period by continued mixing. The extrusion rates of the polymer compositions were then determined on a standard melt indexer (described in ASTM D1238–57T) using first the normal load, then 2 and 5 times the normal load. The extrudates so obtained were allowed to cool and the diameter of each was measured. The die swell of each extrudate was obtained by subtracting the die diameter (0.083 inch) from the extrudate diameter. Evaluation of these plastic compositions are set forth in Table I.

*Table I*

POLYMER CONTAINING ANTI-SWELLING ADDITIVE

| Run | Load (times normal) | Flow rate (g./10 min.) | Diameter of extrudate (in.) | Swell of extrudate (in.) |
|---|---|---|---|---|
| 1 | 1 | 1.90 | 0.119 | 0.036 |
| 2 | 1 | 1.90 | 0.119 | 0.036 |
| 3 | 2 | 5.70 | 0.130 | 0.047 |
| 4 | 2 | 5.70 | 0.130 | 0.047 |
| 5 | 5 | 27.0 | 0.149 | 0.066 |
| 6 | 5 | 26.1 | 0.152 | 0.069 |

POLYMER CONTAINING ONLY ANTI-OXIDANT (ADDED BEFORE MILLING)

| Run | Load (times normal) | Flow rate (g./10 min.) | Diameter of extrudate (in.) | Swell of extrudate (in.) |
|---|---|---|---|---|
| 7 | 1 | 0.258 | 0.153 | 0.070 |
| 8 | 2 | 0.810 | 0.150 | 0.067 |
| 9 | 2 | 0.847 | 0.148 | 0.065 |
| 10 | 5 | 6.36 | 0.162 | 0.079 |

POLYMER CONTAINING ONLY ANTI-OXIDANT (ADDED AFTER MILLING)

| Run | Load (times normal) | Flow rate (g./10 min.) | Diameter of extrudate (in.) | Swell of extrudate (in.) |
|---|---|---|---|---|
| 11 | 1 | 0.08 | polymer cross-linked | |

The data of Table I show that the die swell of the extrudates prepared from the polymer composition containing the additive of this invention was significantly lower than that of the extrudates produced from those polymer compositions which did not contain the additive. Such data further show that the additive of this invention serves to minimize cross-linking of the polymer. The data further show that the decrease in swelling occurs independently of increased flow rate.

Various modifications and alterations of this invention will become apparent to those skilled in the art without departing from the scope and spirit of this invention, and it should be understood that this invention is not to be limited unduly to that preferred embodiment set forth herein for illustrative purposes.

I claim:

1. A method for reducing the tendency of a polymer of ethylene to swell upon being extruded, which comprises incorporating in said polymer an additive comprising in admixture iron phthalocyanine and zinc pentachlorothiophenol in an amount in the range of 0.01 to 5 parts by weight of additive per 100 parts of polymer, the amount of iron phthalocyanine in said additive being from 5 to 95 weight percent and the amount of zinc pentachlorothiophenol being from 95 to 5 weight percent based on the total weight of the iron and zinc compounds.

2. A method of reducing the tendency of a polymer of ethylene to swell upon being extruded, which comprises admixing with said polymer in its molten state an additive comprising in admixture iron phthalocyanine and zinc pentachlorothiophenol in an amount in the range of 0.2 to 3 parts by weight of additive per 100 parts of polymer, the amount of iron phthalocyanine in the additive being from 13 to 17 weight percent and the amount of zinc pentachlorothiophenol being from 83 to 87 weight percent based on the total weight of the iron and zinc compounds.

3. The method according to claim 2 wherein said polymer is polyethylene.

4. The method according to claim 2 wherein said polymer is a copolymer of ethylene and 1-butene.

5. A plastic composition comprising in admixture a polymer of ethylene and an additive comprising in admixture iron phthalocyanine and zinc pentachlorothiophenol in an amount in the range of 0.01 to 5 parts by weight of additive per 100 parts of polymer, the amount of iron phthalocyanine in said additive being from 5 to 95 weight percent and the amount of zinc pentachlorothiophenol being from 95 to 5 weight percent based on the total weight of the iron and zinc compounds.

6. A plastic composition comprising a polymer of ethylene and 0.2 to 3 parts by weight per 100 parts of said polymer of an additive comprising in admixture 13 to 17 weight percent iron phthalocyanine and 83 to 87 weight percent zinc pentachlorothiophenol.

References Cited in the file of this patent
UNITED STATES PATENTS

| | | |
|---|---|---|
| 3,012,016 | Kirk et al. | Dec. 5, 1961 |
| 3,013,309 | Maier et al. | Dec. 19, 1961 |

OTHER REFERENCES

Moran: "Endor a New Chemical Plasticizer"; Elastomers Division, E. I. du Pont de Nemours & Co., Wilmington, Delaware, Report No. 56–5, October 1956.